(12) United States Patent
Bauer et al.

(10) Patent No.: US 10,562,037 B2
(45) Date of Patent: Feb. 18, 2020

(54) MIXER GRINDER MONITORING SYSTEM

(71) Applicant: HOLLYMATIC CORPORATION, Countryside, IL (US)

(72) Inventors: Erik Bauer, Alto, MI (US); Victor Guynn, Romeoville, IL (US)

(73) Assignee: HOLLYMATIC CORPORATION, Countryside, IL (US)

( * ) Notice: Subject to any disclaimer, the term of this patent is extended or adjusted under 35 U.S.C. 154(b) by 739 days.

(21) Appl. No.: 15/003,077

(22) Filed: Jan. 21, 2016

(65) Prior Publication Data

US 2016/0214115 A1 Jul. 28, 2016

Related U.S. Application Data

(60) Provisional application No. 62/106,275, filed on Jan. 22, 2015.

(51) Int. Cl.
*B02C 25/00* (2006.01)
*A22C 5/00* (2006.01)
(Continued)

(52) U.S. Cl.
CPC ................ *B02C 25/00* (2013.01); *A22C 5/00* (2013.01); *B02C 18/30* (2013.01); *B02C 18/301* (2013.01);
(Continued)

(58) Field of Classification Search
CPC ....... B02C 25/00; B02C 18/30; B02C 18/301; B02C 18/302
(Continued)

(56) References Cited

U.S. PATENT DOCUMENTS 3,548,903 A * 12/1970 Holly ........................ A22C 5/00
241/82.1
4,303,205 A * 12/1981 Geiger .................... B02C 25/00
241/17
(Continued)

FOREIGN PATENT DOCUMENTS

CN 203709234 U 7/2014
CN 203720565 U 7/2014
(Continued)

OTHER PUBLICATIONS

International Search Report corresponding to International Application No. PCT/US2016/014240, dated Mar. 25, 2016.
(Continued)

*Primary Examiner* — Elaine Gort
*Assistant Examiner* — Christopher B Wehrly
(74) *Attorney, Agent, or Firm* — Sughrue Mion, PLLC

(57) ABSTRACT

Disclosed is a data logging apparatus comprising a mixer grinder which includes a tub configured to hold a product, a rotatable shaft, at least one mixing blade connected to the rotatable shaft, a grinding chamber, and a feed screw leading to a grinding head. The data logging apparatus includes a first temperature sensor attached to the tub, a second temperature sensor attached to the grinding chamber at an outlet downstream from the grinding head, a memory storing a predetermined temperature threshold, and a processor. The processor is configured to receive temperature data transmitted from the first temperature sensor and the second temperature sensor, determine whether an abnormality has occurred based on received temperature data and the predetermined temperature threshold, and issue an alert indicative of machine malfunction or maintenance issues.

19 Claims, 4 Drawing Sheets

(51) Int. Cl.
    *B02C 23/02*     (2006.01)
    *B02C 18/30*     (2006.01)
    *B02C 23/04*     (2006.01)

(52) U.S. Cl.
    CPC ............ *B02C 18/302* (2013.01); *B02C 23/02* (2013.01); *B02C 23/04* (2013.01)

(58) Field of Classification Search
    USPC ...................................... 241/82.1, 101.8, 33
    See application file for complete search history.

(56) References Cited

U.S. PATENT DOCUMENTS

| | | |
|---|---|---|
| 5,092,528 A | 3/1992 | Rudibaugh |
| 2005/0188859 A1 | 9/2005 | Bruce, III et al. |
| 2006/0044935 A1 | 3/2006 | Benelli et al. |
| 2011/0174169 A1 | 7/2011 | Watanabe et al. |
| 2013/0000493 A1 | 1/2013 | Watanabe et al. |
| 2013/0087644 A1* | 4/2013 | Ephraim ................. B01F 7/001 241/33 |
| 2014/0263777 A1* | 9/2014 | Anderson, Jr. ........... B02C 4/42 241/30 |

FOREIGN PATENT DOCUMENTS

| | | | |
|---|---|---|---|
| CN | 102715850 B | 6/2015 | |
| DE | 102005032678 A1 * | 1/2007 | ............. A22C 11/08 |
| EP | 1997384 A1 | 12/2008 | |
| KR | 10-2008-0069344 A | 7/2008 | |

OTHER PUBLICATIONS

Written Opinion of the International Searching Authority corresponding to International Application No. PCT/US2016/014240, dated Mar. 25, 2016.

Communication dated Aug. 28, 2018 from the European Patent Office in application No. 16740728.7.

* cited by examiner

MIXER GRINDER MONITORING SYSTEM

CROSS REFERENCE TO RELATED APPLICATIONS

The disclosure of U.S. Provisional Patent Application Ser. No. 61/106,275 filed on Jan. 22, 2015 is incorporated herein by reference in its entirety.

BACKGROUND

Technical Field

Exemplary embodiments relate to a system for monitoring operational parameters of a mixer grinder system for preparing a product such as ground meat.

Description of the Related Art

A data logging and parameter monitoring system of exemplary embodiments of the present disclosure may be applicable to mixer grinder apparatuses used in the food processing industry.

As one example of an applicable mixer grinder, see U.S. Pat. No. 3,548,903 A to Holly, issued Dec. 22, 1970, which is hereby incorporated by reference in entirety. An applicable mixer grinder machine processes a product, which may include meat, vegetables, fruits, cheese, and sauces, for example.

In a conventional mixer grinder, such as that described in Holly, mixing is achieved by folding or tumbling the product in a tub by a set of rotating mixing blades. One example of the product is coarsely cut meat. The mixed meat is then passed directly to a grinder. In the bottom of the tub, there is located an exit opening through which the mixed meat passes. Positioned beneath the opening from the tub there is a meat receiving grinding chamber where a meat moving feed screw leading to a conventional grinding head is located.

In operation, mixing action by the rotating mixing blades and paddles urges the meat back and forth in the tub, which tumbles and folds the meat so that very thorough mixing is accomplished. Then, when mixing is sufficiently complete, grinding is commenced by initiating driving of the feed screw. The feed screw, which has a large pitch adjacent the exit opening and a progressively smaller pitch toward the grinding head, rapidly forces the mixed meat through the grinding head. The output is ground meat.

If a second (e.g., finer) grinding is desired, this ground meat is then returned to the tub and processed again. In this instance, mixing can be continued simultaneously with the grinding if desired. Alternatively, two of the above described mixer grinders can be connected in series such that the outlet from the grinding head of the first mixer grinder is fed directly into the tub of the second mixer grinder. An example of such a system is the "Gemini System" produced and sold by Hollymatic Corporation.

In conventional food processing operations, various operational parameters are of interest. However, to date, parameters such as temperature of the product entering and exiting the grinder have conventional been taken by hand, for example, by physically measuring a sample of the pre-mixed product and the processed product exiting the grinder with a thermometer, or have not been taken at all. A manual procedure is laborious, and measurement intervals may lack consistency. Furthermore, some parameters, such as amp draw of the machine and machine temperature during wash down have previously gone unrecorded.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

Exemplary embodiments of the present disclosure may provide an apparatus to measure and store various operational parameters of a mixer grinder system for preparing a product such as ground meat. In particular, the exemplary embodiments may comprise sensors installed in a mixer grinder system that transmit (wirelessly or by wires) measured parameters to a processor and a memory that stores the parameters. Information from the measured parameters may be used to control the operation of the machine, for example, as in a feedback loop to set machine running speed. The information may also be transmitted to a display to provide alerts of parameters indicative of machine malfunction or maintenance issues.

According to an exemplary embodiment of the present invention, there is provided a data logging apparatus comprising a mixer grinder which includes a tub configured to hold a product; a rotatable shaft; at least one mixing blade connected to the rotatable shaft; a grinding chamber; and a feed screw leading to a grinding head. The data logging apparatus also comprises a first temperature sensor attached to the tub; a second temperature sensor attached to the grinding chamber at an outlet downstream from the grinding head; a memory storing a predetermined temperature threshold; and a processor. The processor is configured to receive temperature data transmitted from the first temperature sensor and the second temperature sensor; determine whether an abnormality has occurred based on received temperature data and the predetermined temperature threshold; and issue an alert.

According to another exemplary embodiment of the present invention, there is provided a method of monitoring a mixer grinder system, the mixer grinder system comprising a mixer grinder which includes: a tub configured to hold a product; a rotatable shaft; at least one mixing blade connected to the rotatable shaft; a grinding chamber; and a feed screw leading to a grinding head. The mixer grinder system also comprises a first temperature sensor attached to the tub; and a second temperature sensor attached to the grinding chamber at an outlet downstream from the grinding head. The method comprises acquiring latest measurement information from the first temperature sensor and the second temperature sensor; determining whether an abnormality has occurred based on the received temperature data and the predetermined temperature threshold; and issuing an alert.

According to another exemplary embodiment of the present invention, there is provided a data logging apparatus comprising a mixer grinder which includes a tub configured to hold a product; a rotatable shaft; at least one mixing blade connected to the rotatable shaft; a grinding chamber; and a feed screw leading to a grinding head. The data logging apparatus also comprises a first load sensor coupled to the rotatable shaft; a memory storing a predetermined temperature threshold; and a processor. The processor is configured to receive load data transmitted from the first load sensor; determine whether an abnormality has occurred based on received load data and the predetermined load threshold; and issue an alert.

According to exemplary embodiments, it becomes possible to accurately diagnose the machine condition and reliably identify problems with particular components. Furthermore, it is possible to identify issues with the processed product, for example to make determinations associated with entire batches of product, or to identify other issues.

BRIEF DESCRIPTION OF THE DRAWINGS

The above and other aspects of the present invention will become more apparent from the following description of exemplary embodiments, taken in conjunction with the accompanying drawings of which

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
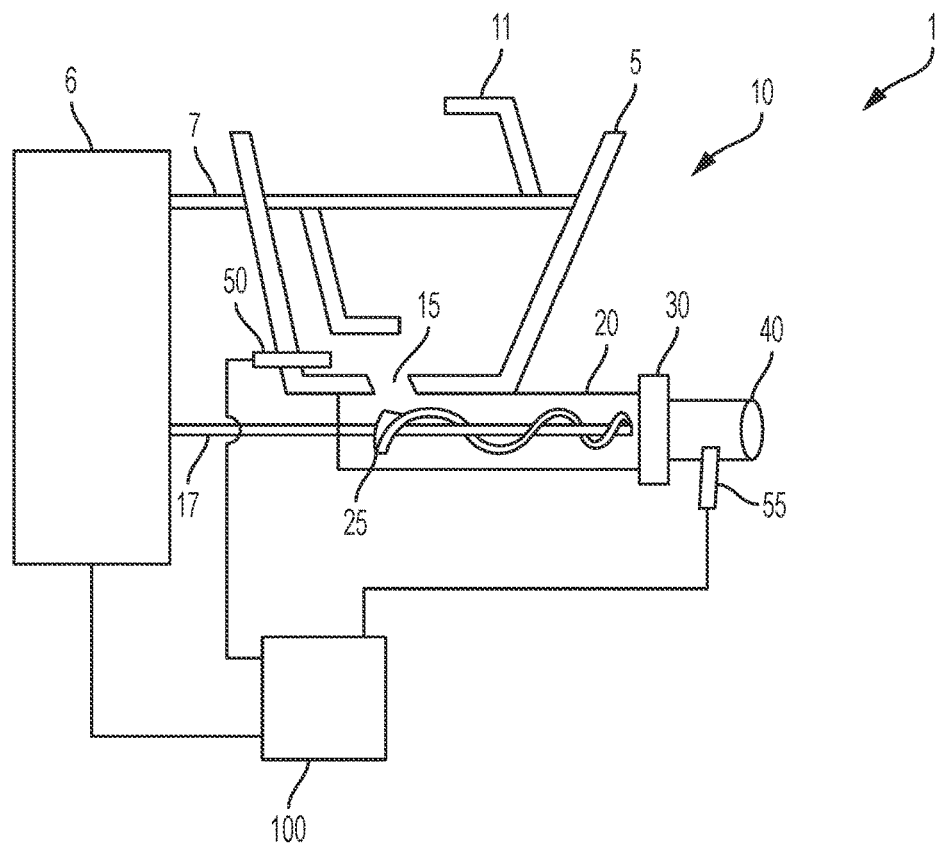
FIG. 1 depicts a mixer grinder monitoring system according to an exemplary embodiment.

As illustrated in FIG. 1, in a first embodiment of the present disclosure, a mixer grinder monitoring system 1 comprises a data logging apparatus, such as a data logger 100 configured to collect data pertinent to product temperature in the tub of the mixer grinder 10. The data logger 100 may also collect data pertinent to product temperature exiting the mixer grinder 10.

A mixer grinder 10 is provided with a tub 5 and a set of rotating mixing blades 11. A motor 6 is connected to a mixer shaft 7 to drive the mixing blades 11, so that a product can be mixed by tumbling the product in the tub 5. In the bottom of the tub 5, there is provided an opening 15 through which the mixed product can pass. Positioned beneath the opening 15 from the tub 5 there is provided a receiving grinding chamber 20 where a feed screw 25 leading to a grinding head 30 is located. The motor 6 is also connected to a grinder shaft 17. Grinding can be commenced by initiating driving of the feed screw 25 by the motor 6. The motor 6 can comprise two separate driving devices to drive the mixer shaft 7 and the grinder shaft 17, or could be configured so that a single driving device powers an output shaft and the output is then split between the mixer shaft and the grinder shaft 17. The feed screw 25, which has a large pitch adjacent the exit opening and a progressively smaller pitch toward the grinding head 30, forces the mixed product through the grinding head 30. The product exiting through an outlet 40 of the grinding chamber 20 is a ground product such as ground meat.

In the first embodiment, sensors are provided which may comprise thermometers configured as a first thermocouple 50 installed in the housing of the tub 5 of the mixer grinder 10 and a second thermocouple 55 installed in the housing of the outlet 40. The first thermocouple 50 and the second thermocouple 55 output measurement data, for example, temperature information, to a processor 101 of the data logger 100. The data logger 100 is, for example, an electronic control unit which receives transmitted data, stores the data, and may control operations of the mixer grinder 10.

Figure 2:
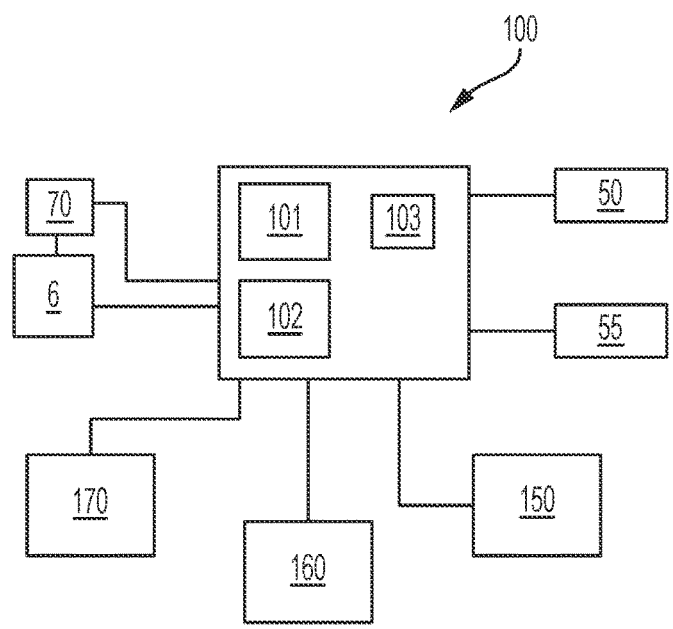
FIG. 2 depicts a data logging apparatus according to an exemplary embodiment.

As shown in FIG. 2, the data logger 100 comprises a processor 101, a memory 102, and a transmission module 103. The transmission module 103 may comprise a wireless transmitter and receiver which communicates with external sensors and other components. In the case of wired connections, the transmission module 103 may comprise input and output ports. In FIG. 2, elements are shown schematically connected with communication lines, however such communications lines need not necessarily be wired connections and could, for example, be wireless. In a case where one of the sensors is a load sensor for measuring current draw of the mixer grinder 10, an ammeter 70 may be provided connected to the motor 6. The data logger 100 may comprise integrally or separately a display 150, an input device 160, and a battery backup 170. An operator can control the machine speed and other operational parameters by manipulating the input device 160.

Figure 3:
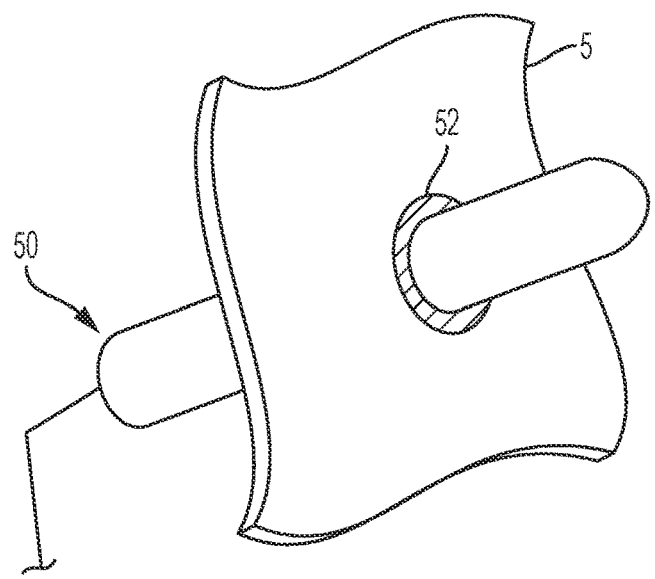
FIG. 3 depicts a temperature sensor probe of an exemplary embodiment.

As shown in FIG. 3, the thermocouples 50 and 55 may be formed as probes extending through the housings and protruding into the interior of the respective chambers, wherein a seal member 52 is interposed between the housing and the probe thereby forming a water-tight seal. Alternatively, the thermocouples 50 and 55 may measure the temperature at the housing where they are installed.

Figure 4:
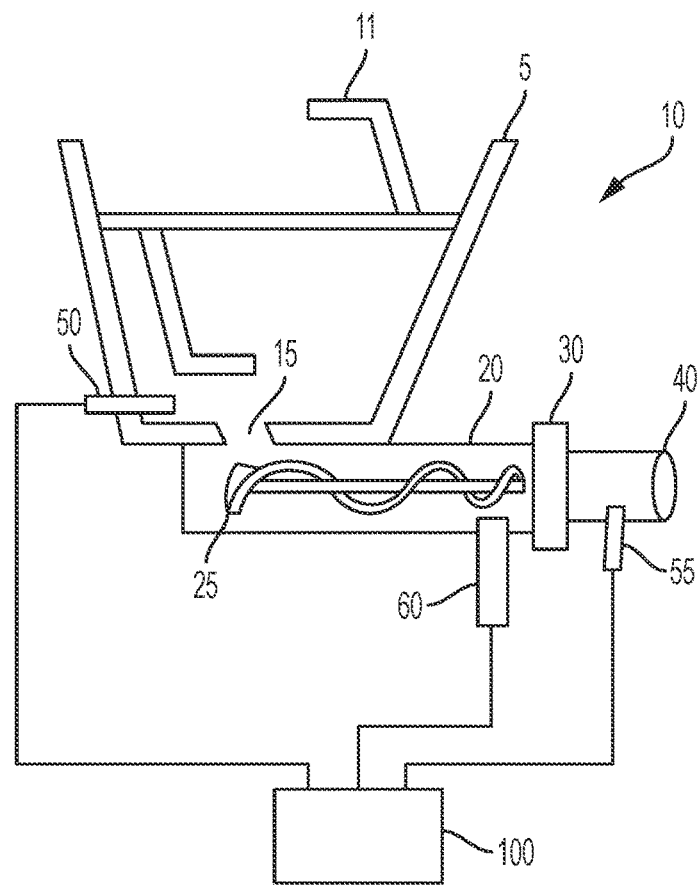
FIG. 4 depicts another mixer grinder monitoring system according to an exemplary embodiment.

As shown in FIG. 4, a third thermocouple 60 may be installed upstream from the grinding head 30 of the mixer grinder 10. It should be noted that the number and positions of the sensors can be varied according to the desired measurements and expected batch size. Furthermore, the sensors may alternatively comprise infrared thermometers which detect thermal radiation from an object at a distance.

The U.S. Department of Agriculture (USDA) may require the collection of certain data for food safety reasons, for example Hazard Analysis Critical Control Point (HACCP) data. In the first embodiment, temperature data relevant to HACCP for meat processing may be automatically collected for this purpose. For example, the number and position of thermocouples may correspond to specific Critical Control Points (CCPs) identified in the food manufacturing process for ground meat using the mixer grinder 10. Pursuant to the principles of HACCP, the data logger 100 may monitor, verify, and validate operations of the mixer grinder 10 and establish a record accordingly. The data logger 100 may create or store predetermined critical limits for each CCP, such as a minimum and maximum value to which a physical parameter (e.g., temperature) must be controlled. The data logger can be configured to detect an abnormality in operation when the limit is exceeded and issue an alert.

The mixing process in the mixing portion of the mixer grinder 10 should typically be kept uniform, thus data indicating non-uniformity in temperature may be useful to diagnose potential problems. For example, if a temperature difference measured between two sensors at separate locations is greater than a predetermined temperature difference threshold, the data logger 100 can issue an alert indicative of the product undergoing localized heating. Furthermore, even if a product does not exceed a maximum temperature specified by a CCP limit value, the product may accumulate time at which the product was close to exceeding the limit. This time might be considered cumulatively to make a determination of product quality, for example tendency for spoilage, and could affect future handling procedures for the product.

Moreover, by analyzing the change in product temperature along various points of the mixing grinding process, for example before and after exiting the grinder, it can be determined if individual machine components, such as the rotating mixing blades 11, the grinding head 30 and feed screw 25 of the mixer grinder 10, must be replaced. For example, dull blades of the rotating mixing blades, a dull grinding plate of the grinding head, or an overly worn feed screw may cause a rise in temperature. A condition such as "dull blades" can then be determined from temperature data and an alert can be displayed indicating that the blades should be replaced. It should be appreciated that sensors can be placed at locations before and after a machine component corresponding to a particular processing step, such as before and after the grinding head 30, to allow the data logger 100 to isolate a temperature rise associated with a component.

A set of temperature schedules can be programmed and saved into the data logger 100. The temperature schedules may correspond to particular predetermined conditions, such as "dull blades". For example, when blades begin to dull, a gradual temperature rise occurring over an extended period, such as several hours, with a sudden steep rise at the end can be expected. Thus, a temperature schedule for "dull blades" may be set in which the data logger 100 is configured to detect a rise in average temperature measured by one of the thermocouples corresponding to the profile of the "dull blades" condition. The data logger 100 may check for a level of correspondence with the schedules, or with a portion of the schedules. For instance, when a gradual temperature rise consistent with an initial phase of the "dull blades" condition is detected, the data logger 100 may be configured to issue an alert prior to the sudden steep rise in temperature which therefore allows an operator to be notified of the need to change the blades before dulling of the blades has a detrimental effect on the product or machine.

Also, temperature trends such as the periodic rise and fall of product in the tub 5 may correspond to normal operations of loading fresh product into the mixer grinder 10. Therefore, the data logger 100 can distinguish such normal temperature profiles from others that may be considered abnormal.

Furthermore, in response to temperature data received by the data logger 100, the data logger 100 can be configured to issue commands to adjust the operation of the mixer grinder 10. For example, when a predetermined temperature threshold is exceeded, the data logger 100 can issue a command to the motor 6 to reduce speed, or stop completely, to further damage to the product or machine.

It should be noted that in the field of food processing, it may be considered advantageous to have the ability to report an alert that could indicate potential health problems that may be tied to particular batches of food.

In a second embodiment, the data logger 100 collects data pertinent to current draw of the mixer grinder 10. In the second embodiment, the sensors may comprise an ammeter 70 connected to the motor 6. Alternatively, the sensors may comprise a load sensor which detects load on the motor 6.

The data logger 100 may be configured to detect a load higher than a predetermined threshold by the ammeter 70, and in response, issue an alert. Alternatively, the data logger 100 can be configured to automatically issue a command to the motor 6 accordingly.

By monitoring for amp spikes, it can be determined if, for example, a frozen piece of meat or a foreign object was placed in the machine, causing it to require more amps to turn the rotating shafts. This information can be used to modify machine operating procedures, for example, establishing a protocol to insert the product within a predetermined temperature range such that the machine does not have to work too hard. The apparatus can also be directed to reduce operating speed or shut down before the electric motor driving the mixer grinder overloads due to misuse, based on this measured data. Furthermore, having continuously monitored and stored such data, energy costs can be accurately determined. For example, total kWh used by the machine can be determined allowing a user to be informed of the true cost of running a mixing grinding program.

In a third embodiment, the data logger 100 collects data pertinent to mixing time and grinding time. In the third embodiment, the sensors may comprise timers which collect time data. The sensors may further comprise counters which collect data such as a total number of accumulated revolutions of the rotating shafts over a given period.

Different food processing establishments have different Standard Operating Procedures (SOPs) for conducting product mixing. By monitoring and logging the total time the mixing portion of the machine is running, it becomes possible to monitor in real time the mixing of their product and correct machine operators who are over or under mixing. For example, the data logger 100 may have stored predetermined criteria for mixing time, and the data logger 100 may compare the measured mixing time to the predetermined criteria and determine whether an unacceptable deviation from the SOP has occurred. The apparatus may output this information as an alert.

By measuring actual grinding time, an accurate comparison can be made to the amount of product output from the machine. For example, a meat mixer grinder machine cannot be left grinding without meat, since meat acts as a lubricant in the mixer grinder, thus data pertinent to grinding time may be a very accurate indicator of expected total amount of output product. The mixer grinder 10 may be equipped with a sensor to detect the presence or absence of product in the grinding chamber 20 or the tub 5. Accordingly, the data logger 100 may automatically stop operation of the mixer grinder when it is detected that there is no product left in the grinding chamber 20 or the tub 5.

Furthermore, total run time of the machine can be recorded, which may allow a wear table to be built for improved preventative maintenance programs. For example, a machine may typically be in service for five years before replacement is scheduled. However, performance of the machine changes with age, due to cumulative wear and tear, therefore a one-year-old machine performs differently from a four-year-old machine. The data logger 100 can determine if a machine is nearing the end of its service lifetime, and then issue an alert that the machine requires a different schedule of preventative maintenance.

Additionally, the data logger 100 can be configured to automatically reduce an upper limit of machine speed accordingly as wear time accumulates. For example, a first wear threshold may be stored in memory, and when the total number of accumulated revolutions exceeds the first wear threshold, the data logger 100 can be configured to reduce the upper limit of speed of the motor 6 so that the mixer shaft 7 and the grinder shaft 17 do not exceed a certain rotational speed.

In a fourth embodiment, the data logger 100 collects data pertinent to wash down temperature. For safety reasons, food processing equipment must be sterilized by bringing the machine up to or beyond a certain temperature at which bacteria is killed. Typically, entire machines are placed in large ovens or washed down liberally with very hot water in order to comply with the temperature requirements. However, by measuring actual machine temperature via the sensors installed at various locations within the machine, it becomes possible to confirm with certainty that all food contacting parts of the machine have been brought up to temperature. Therefore, less water may be required, and a detailed record verifying the safety of the machine can be obtained.

In the fourth embodiment, a battery backup may be provided that allows data collection to proceed even when the machine is unplugged since it is not mixing or grinding.

Figure 5:
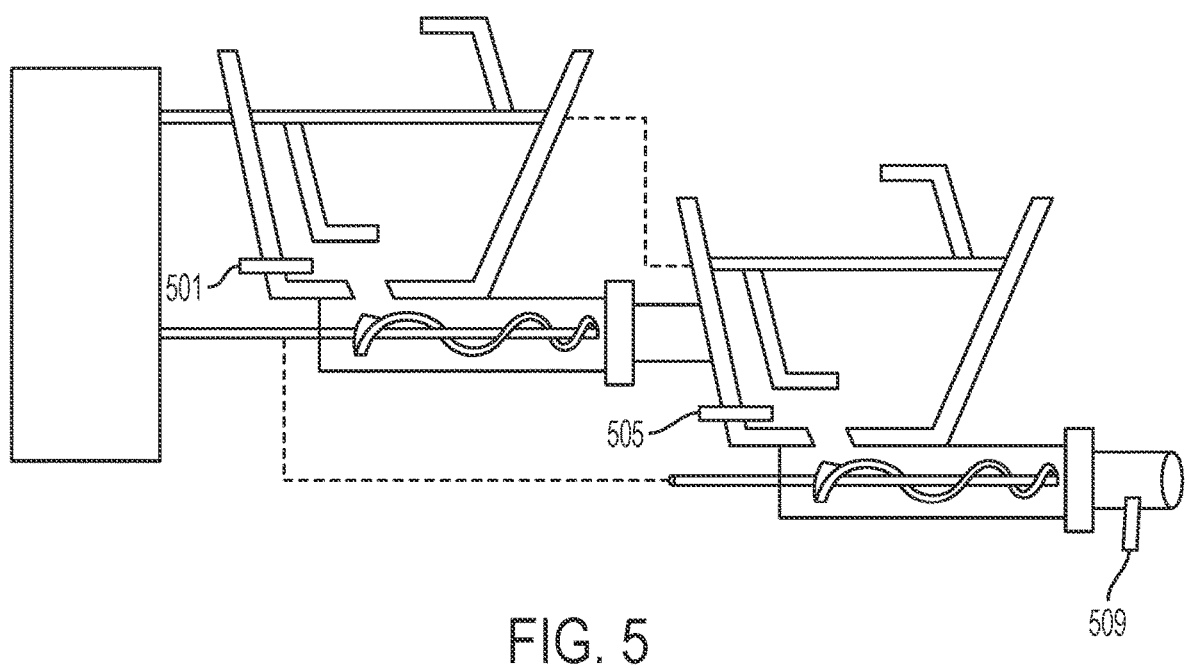
FIG. 5 depicts another mixer grinder monitoring system according to an exemplary embodiment.

In a fifth embodiment, as shown in FIG. 5, instead of the mixer grinder 10 of the first embodiment including only one mixer grinder machine, the data logger 100 may be applied to a Gemini system in which the outlet from the grinding head of the first mixer grinder is fed directly into the tub of a second mixer grinder machine. In the fifth embodiment, a first thermocouple 501 is installed in the tub of the first mixer grinder, a second thermocouple 505 is installed in the tub of the second mixer grinder, and a third thermocouple 509 is installed at the outlet of the second mixer grinder. The data logger 100 is configured to detect an abnormality in the operation of the system based on temperature data received from the first thermocouple 501, the second thermocouple 505, and the third thermocouple 509, and then issue an alert. For example, the data logger 100 may monitor each of the thermocouples for a temperature value exceeding a first predetermined threshold. If the value exceeds the first predetermined threshold, the data logger 100 issues an alert identifying the corresponding portion of the system. The data logger 100 may also calculate and monitor a difference among each of the thermocouples, and if a temperature difference exceeds a predetermined difference threshold, the data logger issues an alert.

In additional exemplary embodiments, one data logger 100 can monitor a plurality of separate machines simultaneously.

Figure 6:
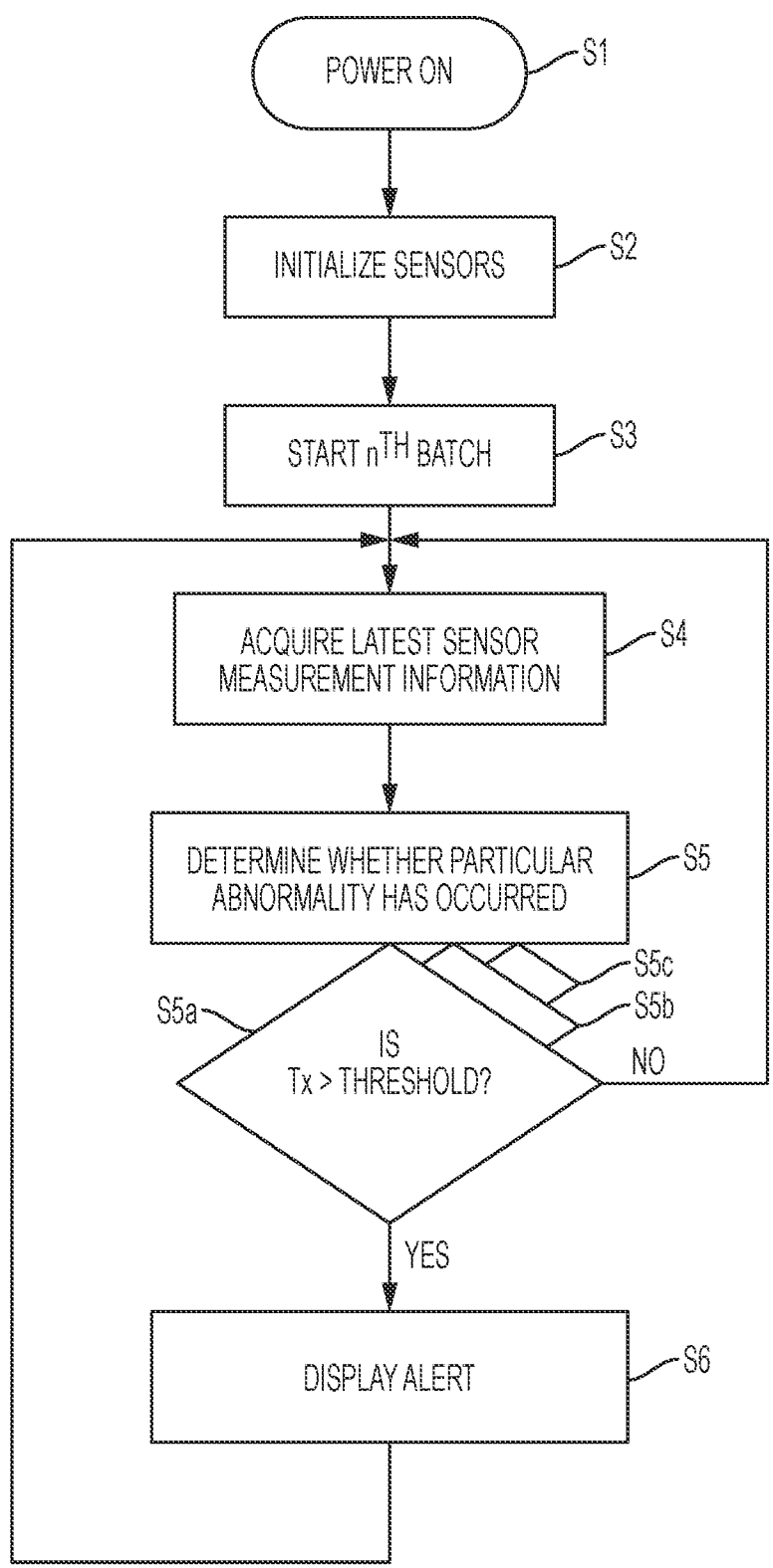
FIG. 6 is a flowchart representing a method for monitoring a mixer grinder system according to an exemplary embodiment.

A method of monitoring a mixer grinder system will now be described with reference to an exemplary monitoring procedure, as outlined by the flowchart of FIG. 6.

In a first step S1, a mixer grinder machine and a data logging apparatus are powered on after being connected to a power source. In a second step S2, sensors are initialized and calibrated.

In a third step S3, a mixing grinding process is started as a product is loaded into a tub of the mixer grinder, rotating shafts are driven, and the start of an $n^{th}$ batch is recorded. Upon completion of step S3, a loop is entered in which the output of the sensors are continuously monitored and compared to predetermined thresholds. For example, in a fourth step S4, a data logger of the data logging apparatus acquires latest measurement information from the sensors. In a fifth step S5, the data logger determines whether an abnormality has occurred based on the received information. In this case, temperature is measured by the sensors and the received temperature information is compared to a predetermined temperature threshold in step S5a. It should be noted that a plurality of steps S5b, S5c, etc., could occur simultaneously as other parameters are compared. In this case, if the measured temperature is not greater than the predetermined temperature threshold, the process returns to step S4. If the measured temperature is greater than the predetermined temperature threshold, the data logger judges that an abnormality has occurred and issues an alert in step S6. The issued alert may take the form of a notice displayed to the machine operator. Alternatively, the issued alert may be recorded and later output in a periodic report regarding the $n^{th}$ batch. As shown in FIG. 6, the process may then return to step S4 where it continues to monitor for additional abnormalities. Alternatively, if the abnormality is deemed critical, the data logger could shut down the mixer grinder and the process could terminate.

As described above, an apparatus to measure and store operational parameters may be applied to a mixer grinder that processes various products such as meat, vegetables, fruits, cheese, sauces, and other similar products. Accordingly, various predetermined criteria, for example mixing time, temperature thresholds for issuing an alert, etc., corresponding to a particular product can be stored in the memory.

It should be noted that although a few exemplary embodiments have been described, those skilled in the art will readily appreciate that many modifications are possible to the exemplary embodiments without materially departing from the novel teachings and advantages of the exemplary embodiments. Accordingly, all such modifications are intended to be included within the scope of the embodiments as defined in the claims. Therefore, it is to be understood that the foregoing is illustrative of various exemplary embodiments and is not to be construed as limited to the specific example embodiments disclosed. For example, it should be noted that an apparatus to measure and store operational parameters may be applied to a meat patty forming machine, which collects pertinent data (e.g., meat and machine temperature) at various points in processing (e.g., pressing, cutting, forming of patties).

What is claimed is:

1. A data logging apparatus comprising:
   a mixer grinder including:
     a tub configured to hold a product;
     a rotatable mixer shaft at least partially extending into the tub;
     at least one mixing blade connected to the rotatable mixer shaft and extending into the tub;
     a grinding chamber; and
     a feed screw leading to a grinding head;
   a first temperature sensor attached to the tub;
   a second temperature sensor attached to the grinding chamber at an outlet downstream from the grinding head;
   a memory storing a plurality of predetermined temperature schedules corresponding to predetermined conditions that occur over a predetermined period of time, each of the plurality of predetermined temperature schedules comprising a plurality of stored predetermined temperature values over the predetermined period of time; and
   a processor configured to:
     receive temperature data transmitted from the first temperature sensor and the second temperature sensor;
     determine whether an abnormality has occurred based on a level of correspondence between received temperature data over a period of time and the plurality of stored predetermined temperature values over the predetermined period of time of one of the plurality of predetermined temperature schedules; and issue an alert upon the determination that the abnormality has occurred.

2. The apparatus of claim 1, further comprising:

a third temperature sensor attached to the grinding chamber at a location upstream from the grinding head, wherein the processor is configured to receive temperature data transmitted from the third temperature sensor and determine whether an abnormality has occurred based on received temperature data.

3. The apparatus of claim 2, wherein the processor is configured to determine whether a mixing abnormality has occurred based on received temperature data from the first temperature sensor and the third temperature sensor and a predetermined mixing temperature threshold.

4. The apparatus of claim 2, wherein the processor is configured to determine whether a grinding abnormality has occurred based on received temperature data from the third temperature sensor and the second temperature sensor and a predetermined grinding temperature threshold.

5. The apparatus of claim 1, wherein the processor is configured to calculate a difference between a first temperature measured by the first temperature sensor and a second temperature measured by the second temperature sensor, and determine whether an abnormality has occurred based on the difference between the first temperature and the second temperature and a predetermined temperature difference threshold.

6. The apparatus of claim 1, further comprising:

a battery backup configured to supply power to the processor.

7. The apparatus of claim 1, wherein when it is determined the abnormality has occurred, the processor is configured to issue a command to adjust speed of the rotatable mixer shaft or the feed screw.

8. The apparatus of claim 1, wherein when it is determined the abnormality has occurred, the processor is configured to issue a command to stop the rotatable mixer shaft or the feed screw.

9. A method of monitoring a mixer grinder system, the mixer grinder system including a mixer grinder including: a tub configured to hold a product; a rotatable mixer shaft at least partially extending into the tub; at least one mixing blade connected to the rotatable mixer shaft and extending into the tub; a grinding chamber; and a feed screw leading to a grinding head; a first temperature sensor attached to the tub; a second temperature sensor attached to the grinding chamber at an outlet downstream from the grinding head; and a memory storing a plurality of predetermined temperature schedules corresponding to predetermined conditions that occur over a predetermined period of time, each of the plurality of predetermined temperature schedules comprising a plurality of stored predetermined temperature values over the predetermined period of time; the method comprising:

acquiring latest measurement information from the first temperature sensor and the second temperature sensor;

determining whether an abnormality has occurred based on a level of correspondence between received temperature data over a period of time and the plurality of stored predetermined temperature values over the predetermined period of time of one of the plurality of predetermined temperature schedules; and issuing an alert upon the determination that the abnormality has occurred.

10. The method of claim 9, wherein the mixer grinder system further comprises a third temperature sensor attached to the grinding chamber at a location upstream from the grinding head;

the method further comprising receiving temperature data transmitted from the third temperature sensor and determining whether an abnormality has occurred based on received temperature data.

11. The method of claim 10, further comprising:

determining whether a mixing abnormality has occurred based on received temperature data from the first temperature sensor and the third temperature sensor and a predetermined mixing temperature threshold.

12. The method of claim 10, further comprising:

determining whether a grinding abnormality has occurred based on received temperature data from the third temperature sensor and the second temperature sensor and a predetermined grinding temperature threshold.

13. The method of claim 9, further comprising:

calculating a difference between a first temperature measured by the first temperature sensor and a second temperature measured by the second temperature sensor, and determining whether an abnormality has occurred based on the difference between the first temperature and the second temperature and a predetermined temperature difference threshold.

14. The method of claim 9, further comprising:

when it is determined the abnormality has occurred, issuing a command to adjust speed of the rotatable mixer shaft or the feed screw.

15. The method of claim 9, further comprising:

when it is determined the abnormality has occurred, issuing a command to stop the rotatable mixer shaft or the feed screw.

16. The data logging apparatus according to claim 1, further comprising a first load sensor coupled to the rotatable shaft;

the memory storing a predetermined load threshold;

wherein the processor is configured to:

receive load data transmitted from the first load sensor;

determine whether a load abnormality has occurred based on received load data and the predetermined load threshold; and issue an alert upon the determination that the load abnormality has occurred based on received load data.

17. The apparatus of claim 16, wherein when it is determined the load abnormality has occurred, the processor is configured to issue a command to adjust speed of the rotatable mixer shaft.

18. The apparatus of claim 16, further comprising:

a second load sensor coupled to the feed screw, wherein the processor is configured to receive load data transmitted from the second load sensor and determine whether an load abnormality has occurred based on received load data.

19. The apparatus of claim 18, wherein when it is determined the load abnormality has occurred, the processor is configured to issue a command to adjust speed of the feed screw.

* * * * *